(12) United States Patent
Hirose (10) Patent No.: US 8,369,231 B2
(45) Date of Patent: Feb. 5, 2013

(54) COMMUNICATION DEVICE, COMMUNICATION METHOD, CONTROL METHOD FOR COMMUNICATION DEVICE, AND COMMUNICATION SYSTEM

(75) Inventor: Takatoshi Hirose, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 11/673,320

(22) Filed: Feb. 9, 2007

(65) Prior Publication Data

US 2007/0189322 A1    Aug. 16, 2007

(30) Foreign Application Priority Data

Feb. 10, 2006    (JP) .................................. 2006-034033

(51) Int. Cl.
*H04L 12/24* (2006.01)
(52) U.S. Cl. .......................... 370/252; 370/254; 370/447
(58) Field of Classification Search .................. 370/447, 370/252, 254; 712/26
See application file for complete search history.

(56) References Cited

U.S. PATENT DOCUMENTS

| 6,820,126 B2 | 11/2004 | Sibecas et al. |
| 2003/0065851 A1 | 4/2003 | Layman |
| 2003/0097291 A1* | 5/2003 | Freedman .......................... 705/8 |
| 2003/0162556 A1* | 8/2003 | Libes ............................. 455/507 |
| 2004/0114521 A1 | 6/2004 | Sugaya |
| 2004/0203373 A1 | 10/2004 | Ogino et al. |
| 2005/0096031 A1 | 5/2005 | Sugaya |
| 2005/0160261 A1 | 7/2005 | Barry et al. |
| 2005/0183115 A1* | 8/2005 | Maruyama et al. ............. 725/38 |
| 2005/0239438 A1* | 10/2005 | Naghian ........................ 455/410 |
| 2006/0200564 A1 | 9/2006 | Watanabe et al. |
| 2007/0064634 A1* | 3/2007 | Huotari et al. ................ 370/310 |

FOREIGN PATENT DOCUMENTS

| EP | 1458206 A2 | 9/2004 |
| EP | 1617596 A1 | 1/2006 |
| JP | 2003-229867 A | 8/2003 |
| KR | 10-2004-0075702 A | 8/2004 |
| KR | 10-2006-0007009 A | 1/2006 |
| WO | 2004095778 A1 | 11/2004 |
| WO | 2005013569 A1 | 2/2005 |
| WO | 2006106393 A2 | 10/2006 |

* cited by examiner

*Primary Examiner* — Huy D Vu
*Assistant Examiner* — Omer Mian
(74) *Attorney, Agent, or Firm* — Canon U.S.A., Inc., IP Division (57) ABSTRACT

A combination of devices in which communication parameters are to be set is selected on the basis of information indicating the capabilities of communication devices located on a network, and an unselected device is notified of termination of the setting of the communication parameters. Therefore, the communication parameters are set in a desired combination of devices, and the communication parameters are not set in an unintended pair of devices.

6 Claims, 8 Drawing Sheets

| INDEX | MAC ADDRESS | DEVICE ATTRIBUTE | DEVICE CATEGORY | COMMUNICATION PARAMETER SERVICE ATTRIBUTE |
|---|---|---|---|---|
| 1 | 11:11:11:11:11:11 | PRINTER | OUT | PARAMETER PROVIDER |
| 2 | 22:22:22:22:22:22 | VIDEO CAMERA | IN | PARAMETER RECEIVER |
| 3 | 33:33:33:33:33:33 | STILL CAMERA | IN | PARAMETER RECEIVER |
| 4 | 00:00:00:00:00:00 | | | |
| 5 | 00:00:00:00:00:00 | | | |

FIG. 8

| INDEX | MAC ADDRESS | DEVICE ATTRIBUTE | DEVICE CATEGORY | COMMUNICATION PARAMETER SERVICE ATTRIBUTE |
|---|---|---|---|---|
| 1 | 11:11:11:11:11:11 | STILL CAMERA | IN | PARAMETER RECEIVER |
| 2 | 22:22:22:22:22:22 | PRINTER | OUT | PARAMETER RECEIVER |
| 3 | 33:33:33:33:33:33 | PRINTER | OUT | PARAMETER PROVIDER/RECEIVER |
| 4 | 00:00:00:00:00:00 | | | |
| 5 | 00:00:00:00:00:00 | | | |

12 # COMMUNICATION DEVICE, COMMUNICATION METHOD, CONTROL METHOD FOR COMMUNICATION DEVICE, AND COMMUNICATION SYSTEM

BACKGROUND OF THE INVENTION

1. Field of the Invention

The present invention relates to communication devices for performing communication parameter setting.

2. Description of the Related Art

When communication is to be performed between devices using IEEE 802.11 wireless local area networks (LANs), wireless communication parameters such as a communication channel, a network identifier called a service set identifier (SSID), an encryption method, an encryption key, an authentication method, and an authentication key are set in the devices. Such communication parameters are generally set using user interfaces of the devices. However, the setting operation is time consuming. In particular, it is difficult for devices other than personal computers (PCs), such as digital cameras and printers, to input character strings such as a network identifier and an encryption key.

Recently, systems for performing communication over so-called ad-hoc networks have been realized. The ad-hoc networks allow devices to directly communicate with one another via a wireless LAN without using an access point. In the ad-hoc networks, there has also been a demand for a method for easily setting wireless communication parameters in devices.

U.S. Patent Laid-Open No. 2006-200564 (corresponding to Japanese Patent Laid-Open No. 2004-328289) discloses a technique for establishing a communication channel between two wireless communication devices using wireless communication.

In U.S. Patent Laid-Open No. 2006-200564, however, if a response to a request for establishing a communication channel is issued from a plurality of devices, an operation for interrupting the establishment of the communication channel or an operation for causing a user to select a communication partner is performed.

Therefore, if an unintended device exists when a communication channel is to be established, the establishment of communication is performed again from the beginning, or, otherwise, a user needs to select a communication partner.

SUMMARY OF THE INVENTION

In view of the above-described problems, the present invention provides a technique for setting communication parameters in devices when devices other than the devices in which the communication parameters are to be set exist on a network.

According to an aspect, the present invention provides a communication device including a selecting unit that selects, on the basis of capability information relating to other communication devices located on a network of which the communication device is a part, a combination of devices for which a communication parameter for configuring a second network is to be set; and a notifying unit that notifies a device that is not selected by the selecting unit of termination of a communication parameter setting process.

According to another aspect, the present invention provides a communication device including a determining unit that determines first information and second information as capability information of other communication devices located on a network of which the communication device is also a part, the first information being information concerning a communication-parameter-providing capability and the second information being information concerning a device type; a first extracting unit that extracts at least one combination of devices in which a communication parameter for configuring a second network is to be set on the basis of the first information; a second extracting unit that extracts at least one combination of devices in which the communication parameter is to be set from among the at least one combination of devices extracted by the first extracting unit on the basis of the second information; and a selecting unit that selects a combination of devices in which the communication parameter is to be set on the basis of the combination of devices extracted by the first extracting unit and the combination of devices extracted by the second extracting unit.

According to a further aspect, the present invention provides a communication device including a receiver that receives, from a second communication device located on a network of which the communication device is also a part, a request for performing setting of a communication parameter for configuring a second network or a request for terminating the setting of the communication parameter; and an executing unit that selectively performs communication for setting the communication parameter or terminates the setting of the communication parameter in response to the request received by the receiver from the second communication device.

According to a still further aspect, the present invention provides a method for controlling a communication device for setting a communication parameter. The method includes a selecting step of selecting, on the basis of capability information relating to communication devices located on a network of which the communication device is a part, a combination of devices for which a communication parameter for configuring a second network is to be set; and a notifying step of notifying a device that is not selected in the selecting step of termination of a communication parameter setting process.

According to a still further aspect, the present invention provides a method for controlling a communication device for setting a communication parameter. The method includes a receiving step of receiving, from a second communication device located on a network of which the communication device is also a part, a request for performing setting of a communication parameter for configuring a second network or a request for terminating the setting of the communication parameter; and a step of selectively performing communication for setting the communication parameter or terminating the setting of the communication parameter in response to the request received in the receiving step from the second communication device.

According to a still further aspect, the present invention provides a communication method for setting a communication parameter. The communication method includes a step of, by communication devices, establishing a communication parameter setting network; a step of determining from among the communication devices a selection device configured to select a combination of devices for which a communication parameter for configuring a second network is to be set; a step of, by the selection device, selecting the combination of devices in which the communication parameter is to be set on the basis of capability information relating to the other communication devices; and a step of, by a communication device that is not selected by the selection device, terminating a communication parameter setting process.

According to a still further aspect, the present invention provides a communication system for setting a communication parameter. The communication system includes a plurality of communication devices located on a network, wherein a selection device is determined from among the plurality of communication devices. The selection device includes a selecting unit that selects, on the basis of capability information relating to other communication devices located on the network, a combination of devices for which a communication parameter for configuring a second network is to be set; and a notifying unit that notifies a request for performing setting of the communication parameter or a request for terminating the setting of the communication parameter according to a selection result obtained by the selecting unit. The other communication devices include a receiver that receives the request for performing the setting of the communication parameter for configuring the second network or the request for terminating the setting of the communication parameter; and a unit that selectively performs the setting of the communication parameter or terminates the setting of the communication parameter in response to the request received by the receiver.

According to a still further aspect, the present invention provides a program for use in performing a method for controlling a communication device, the method including a selecting step of selecting, on the basis of capability information relating to communication devices located on a network of which the communication device is a part, a combination of devices for which a communication parameter for configuring a second network is to be set; and a notifying step of notifying a device that is not selected in the selecting step of termination of a communication parameter setting process.

According to a still further aspect, the present invention provides a program for use in performing a method for controlling a communication device, the method including a receiving step of receiving, from a second communication device located on a network of which the communication device is also a part, a request for performing setting of a communication parameter for configuring a second network or a request for terminating the setting of the communication parameter; and a step of selectively performing communication for setting the communication parameter or terminating the setting of the communication parameter in response to the request received in the receiving step from the second communication device.

According to a still further aspect, the present invention provides a program for use in performing a communication method for setting a communication parameter, the method including a step of, by communication devices, establishing a communication parameter setting network; a step of determining from among the communication devices a selection device configured to select a combination of devices for which a communication parameter for configuring a second network is to be set; a step of, by the selection device, selecting the combination of devices in which the communication parameter is to be set on the basis of capability information relating to the other communication devices; and a step of, by a communication device that is not selected by the selection device, terminating a communication parameter setting process.

Further features of the present invention will become apparent from the following description of exemplary embodiments with reference to the attached drawings.

DESCRIPTION OF THE EMBODIMENTS

Exemplary embodiments of the present invention will be described in detail with reference to the drawings.

In the exemplary embodiments, a process for configuring an ad-hoc network that allows direct wireless communication between devices will be described.

A wireless communication button of each of the devices is pressed to thereby configure an ad-hoc network for setting wireless communication parameters. In the ad-hoc network of the exemplary embodiments, each device operates as a master or a slave.

In the exemplary embodiments, a device that first establishes an ad-hoc network for setting wireless communication parameters is a master. The master device manages Media Access Control (MAC) addresses and the like of the other devices located within the same network as the network on which the master device exists.

The master device transmits a "capability request" to the slave devices as a request for transmission of the device capabilities, and the slave devices return their device capabilities as a "capability response" according to the request. The "capability response" includes an MAC address, a device attribute (such as a printer or a still camera), a device category (an input device or an output device), and a communication parameter service attribute (a parameter receiver or a parameter provider).

The master device determines a pair of devices in which the wireless communication parameters are to be set on the basis of the device capability information transmitted from the slave devices, and instructs that the determined pair of devices perform parameter setting. Upon receiving the instruction from the master device, the slave device or devices perform transmission and reception of the wireless communication parameters, and set the wireless communication parameters. Actual data communication can therefore be performed between the devices in which the wireless communication parameters have been set. The wireless communication parameters include a communication channel, a network identifier (SSID), an encryption method, an encryption key, an authentication method, and an authentication key.

Both the master and the slave periodically send a notification of their presence (master announcement and slave announcement).

First Embodiment

Figure 3:
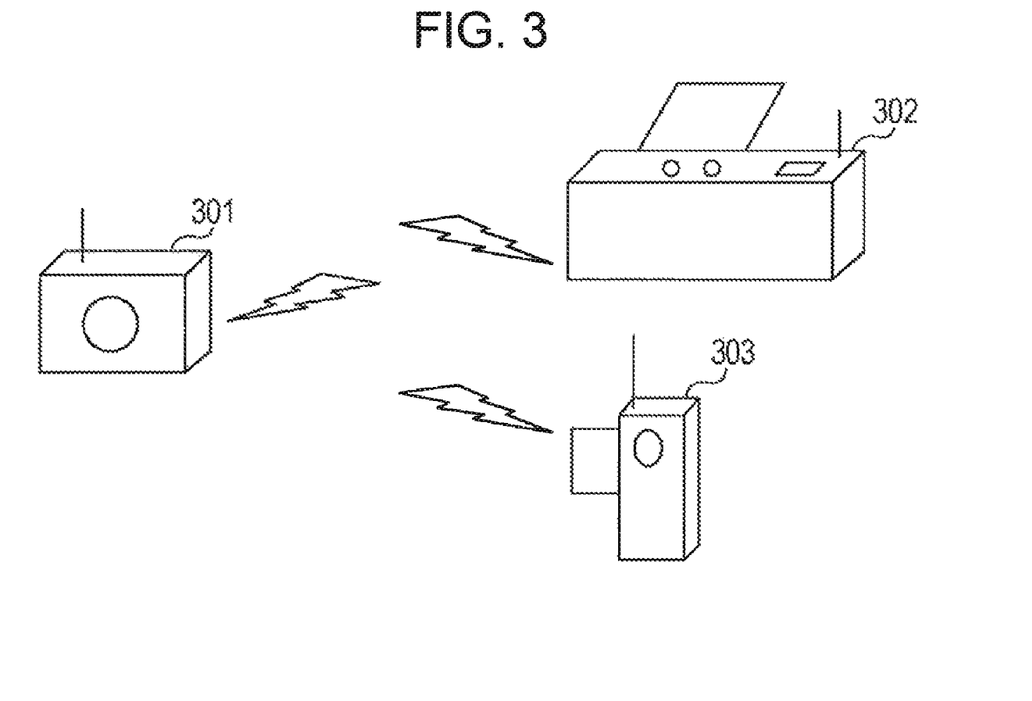
FIG. 3 is a system configuration diagram of a system according to a first embodiment of the present invention.

FIG. 3 is a system configuration diagram of a system according to a first embodiment of the present invention. Each of a digital still camera (hereinafter referred to as a "DSC") 301, a printer (hereinafter referred to as a "PRN") 302, and a digital video camera (hereinafter referred to as a "DVC") 303 has a wireless communication function. A wireless communication button of each of the devices is pressed to thereby establish an ad-hoc network for setting the wireless communication parameters.

It is assumed here that wireless communication is performed between the DSC 301 and the PRN 302 to print image data stored in the DSC 301 using the PRN 302. The first embodiment will be described with respect to a case in which the DVC 303, which is not intended by the user, exists on the same network as the DSC 301 and the PRN 302 when the wireless communication buttons of the DSC 301 and the PRN 302 are pressed to start wireless communication.

Figure 1:
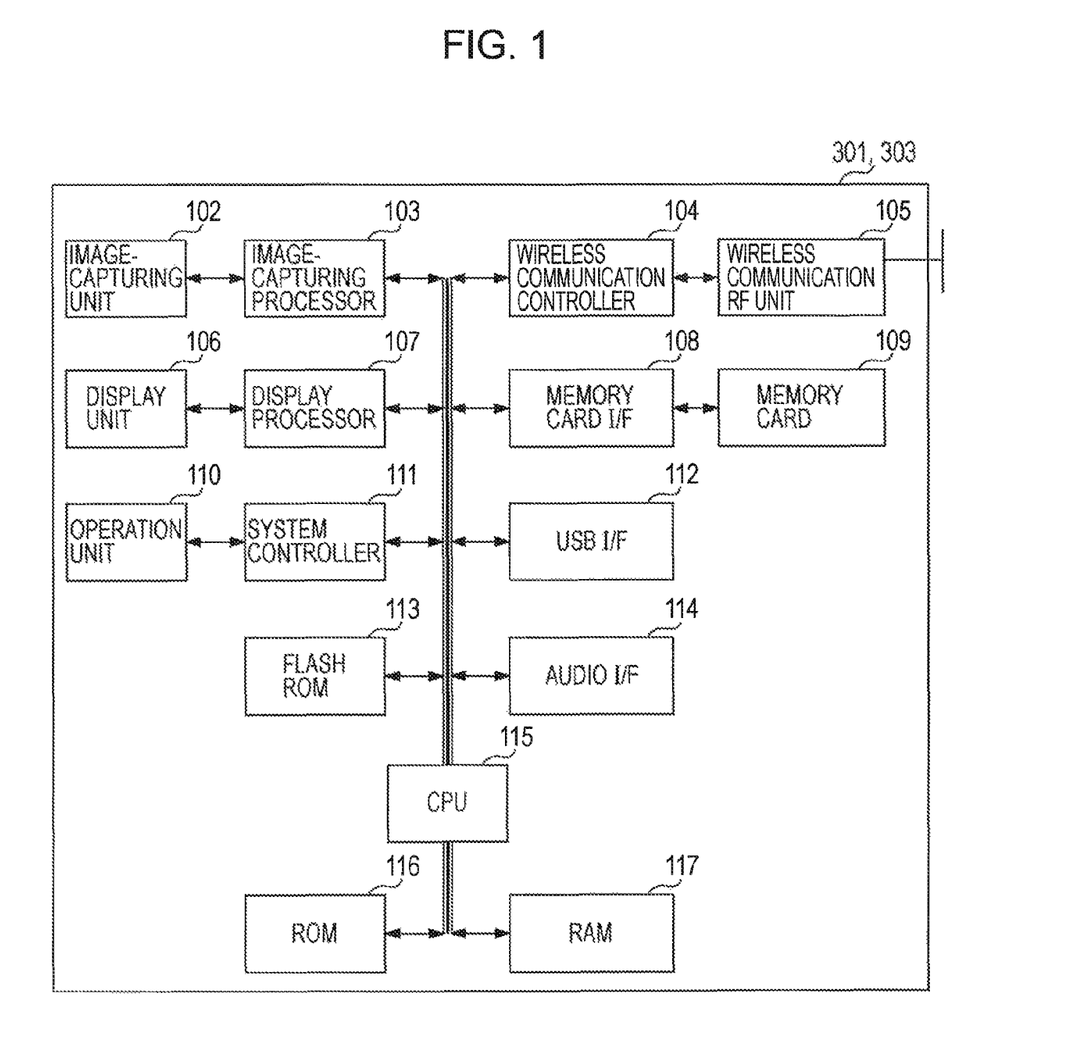
FIG. 1 is a block diagram of a digital camera and a digital video camera.

FIG. 1 is a functional block diagram of the DSC 301 according to the first embodiment. The DVC 303 has a similar functional structure to that of the DSC 301.

An operation unit 110 is connected to a central processing unit (CPU) 115 via a system controller 111. The operation unit 110 includes various keys such as a shutter switch and a wireless communication button.

An image-capturing unit 102 is a block for capturing an image when a shutter is released, and is processed by an image-capturing processor 103.

A display unit 106 is a block for displaying information to a user, such as a liquid crystal display (LCD), a light-emitting diode (LED) display, or an audio display. A display processor 107 performs display control of the display unit 106. The display unit 106 is operated with the operation unit 110 to select an option from the information displayed on the display unit 106. That is, the display unit 106 and the operation unit 110 constitute a user interface.

A wireless communication RF unit 105 and a wireless communication controller 104 constitute a wireless communication interface. The wireless communication RF unit 105 includes a hardware block for converting an analog signal received from an antenna into a digital signal and converting a digital signal into an analog signal to be transmitted from the antenna. The wireless communication controller 104 is formed of hardware for processing a MAC layer responsible for controlling communication and firmware for driving the MAC layer. The wireless communication controller 104 includes a built-in flash read-only memory (ROM) for storing the MAC addresses and the like.

A memory card interface (hereinafter referred to as an "I/F") 108 is an interface to which a memory card 109 is connected. A universal serial bus (USB) I/F 112 is an interface for connecting to an external device using a USB. An audio I/F 114 is an interface for connecting an audio signal to an external device.

Figure 9:
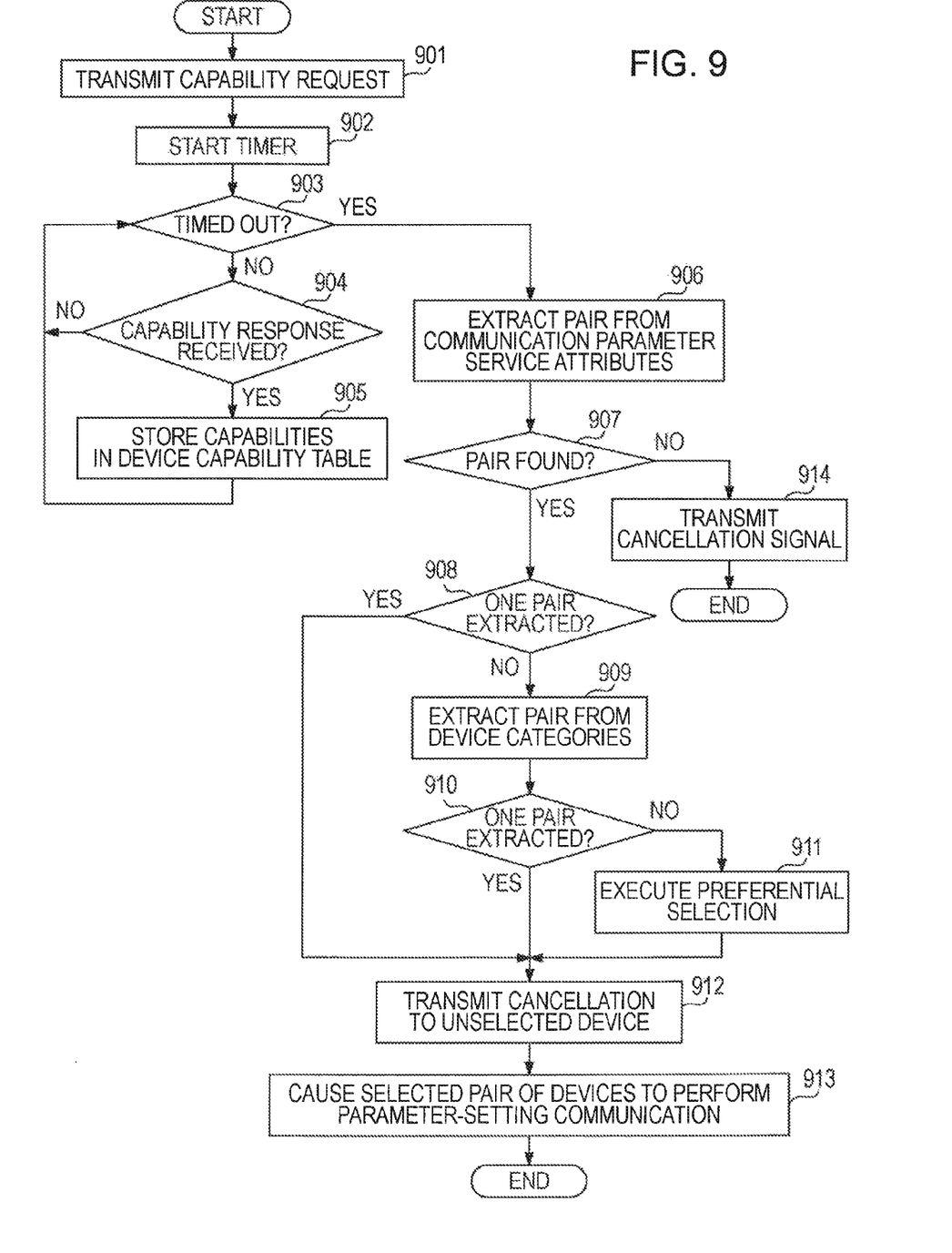
FIG. 9 is a flowchart showing the operation of a master device according to the first and second embodiments.
Figure 10:
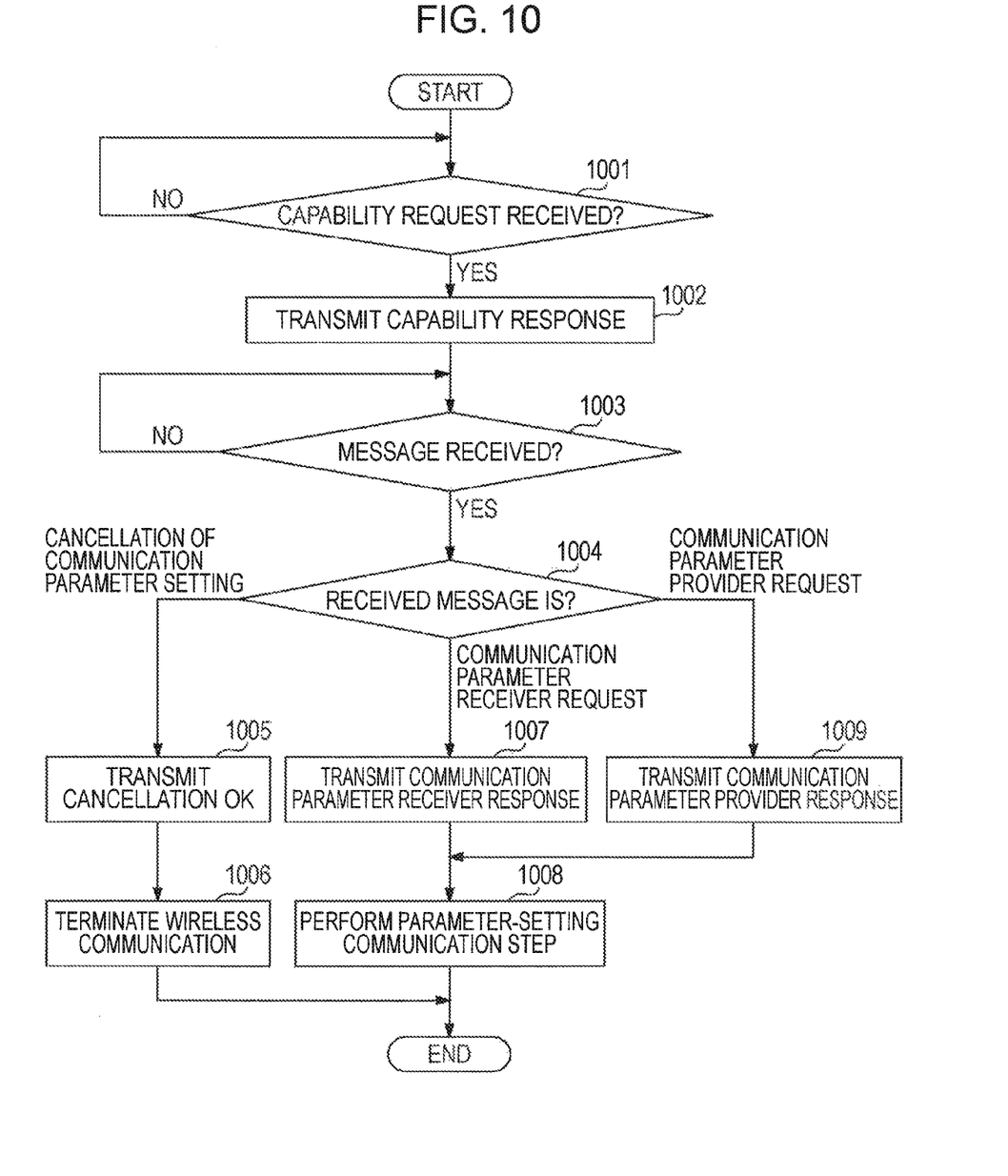
FIG. 10 is a flowchart showing the operation of a slave device according to the first and second embodiments.

The functional blocks illustrated in FIG. 1 are processed under the control of the CPU 115. Operation programs described below with reference to FIGS. 9 and 10 are stored in a ROM 116, a flash ROM 113, or the memory card 109, and the CPU 115 performs processing according to the programs.

Data processed by the CPU 115 is written to or read from a random access memory (RAM) 117, the flash ROM 113, or the memory card 109. It is to be noted that captured image data is stored in the memory card 109.

Figure 7:
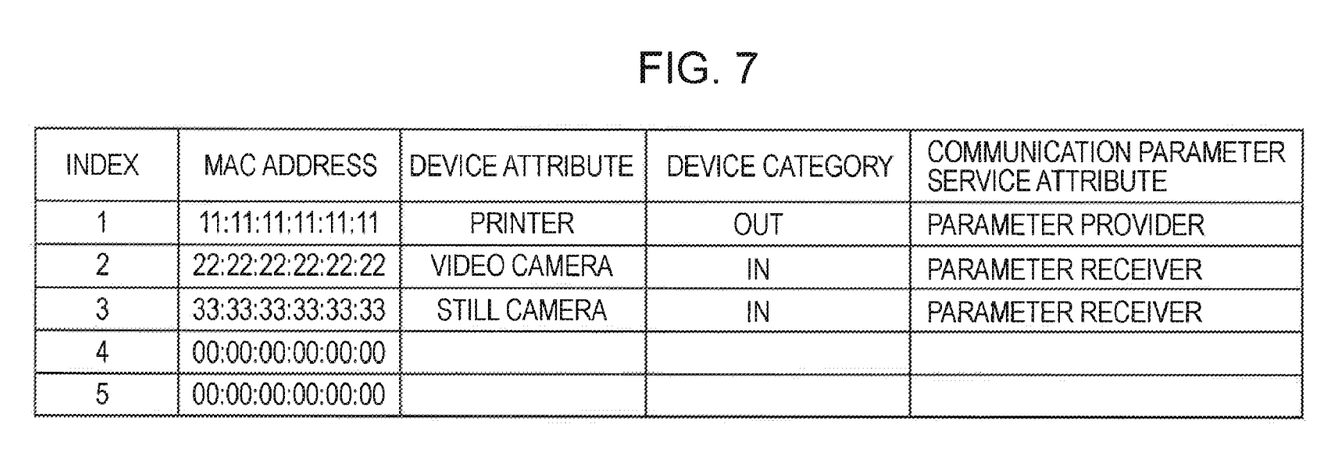
FIG. 7 is a device capability table of the first embodiment.
Figure 8:
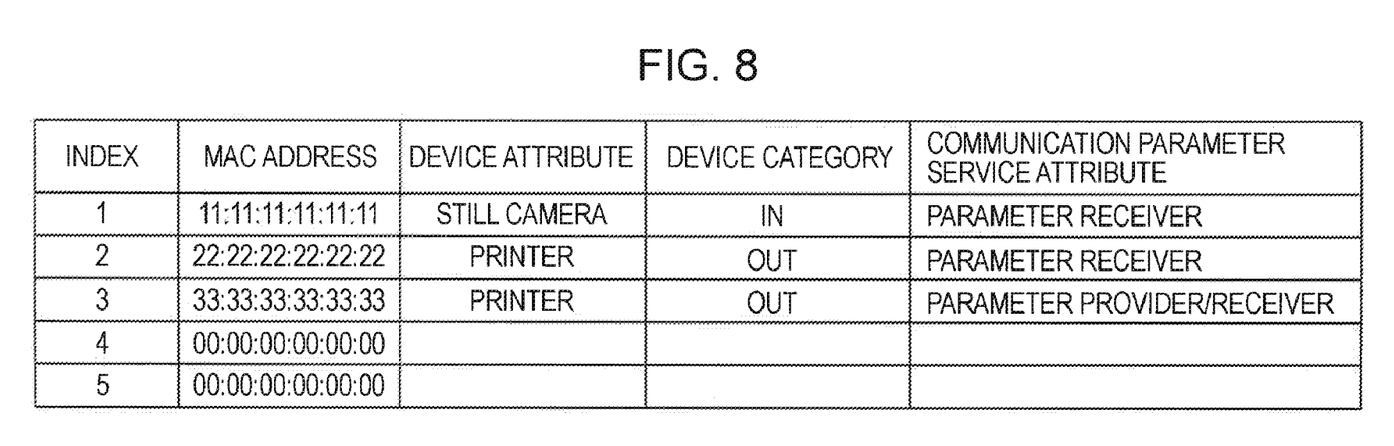
FIG. 8 is a device capability table of the second embodiment.

The flash ROM 113 stores a device capability table (see FIGS. 7 and 8). The device capability table is used to select a communication device.

Figure 2:
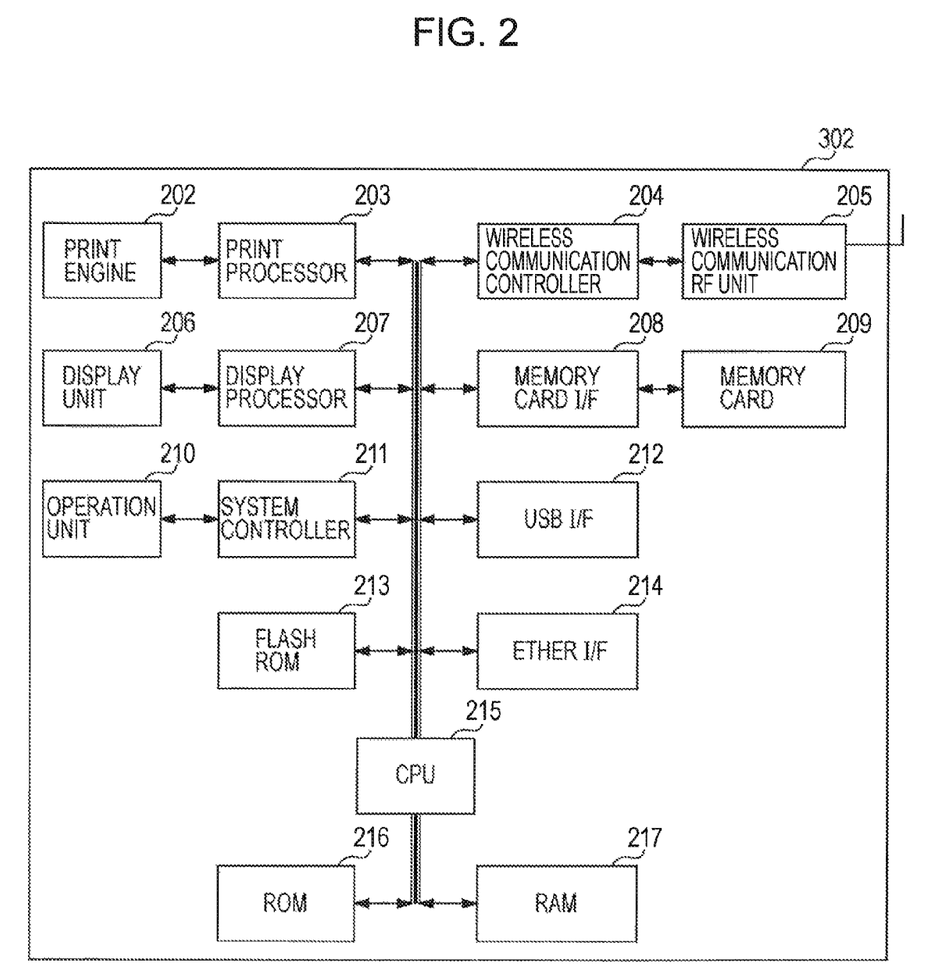
FIG. 2 is a block diagram of a printer.

FIG. 2 is a functional block diagram of the PRN 302 according to the first embodiment.

An operation unit 210 is connected to a CPU 215 via a system controller 211.

A print engine 202 is a functional block for actually printing an image on a sheet of paper, and is processed by a print processor 203. In the first embodiment, the print engine 202 is an ink-jet print engine for ejecting ink droplets onto a recording medium such as a sheet of recording paper using thermal energy, although any other print engine may be used.

A display unit 206 is a block for displaying information to a user, such as an LCD display, an LED display, or an audio display. A display processor 207 performs display control of the display unit 206. An option is selected from the information displayed on the display unit 206 using the operation unit 210. That is, the display unit 206 and the operation unit 210 serve as a user I/F of the PRN 302 in the first embodiment.

A memory card I/F 208 is an interface to which a memory card 209 is connected. A USB I/F 212 is an interface for connecting to an external device using a USB. An Ether I/F 214 is an interface for connecting to an external device via an Ethernet connection.

A wireless communication RF unit 205 and a wireless communication controller 204 constitute a wireless interface. The wireless communication RF unit 205 includes a hardware block for converting an analog signal received from an antenna into a digital signal and converting digital information into an analog signal to be transmitted from the antenna. The wireless communication controller 204 is formed of hardware for processing, a MAC layer responsible for controlling communication, and firmware for driving the MAC layer. The wireless communication controller 204 includes a built-in flash ROM for storing the MAC addresses and the like.

The functional blocks illustrated in FIG. 2 are processed under the control of the CPU 215. The operation programs described below with reference to FIGS. 9 and 10 are stored in a ROM 216, a flash ROM 213, or the memory card 209, and the CPU 215 performs processing according to the programs. Data processed by the CPU 215 is written to or read from a RAM 217, the flash ROM 213, or the memory card 209.

The flash ROM 213 stores a device capability table (see FIGS. 7 and 8). The device capability table is used to select a communication device.

Figure 5:
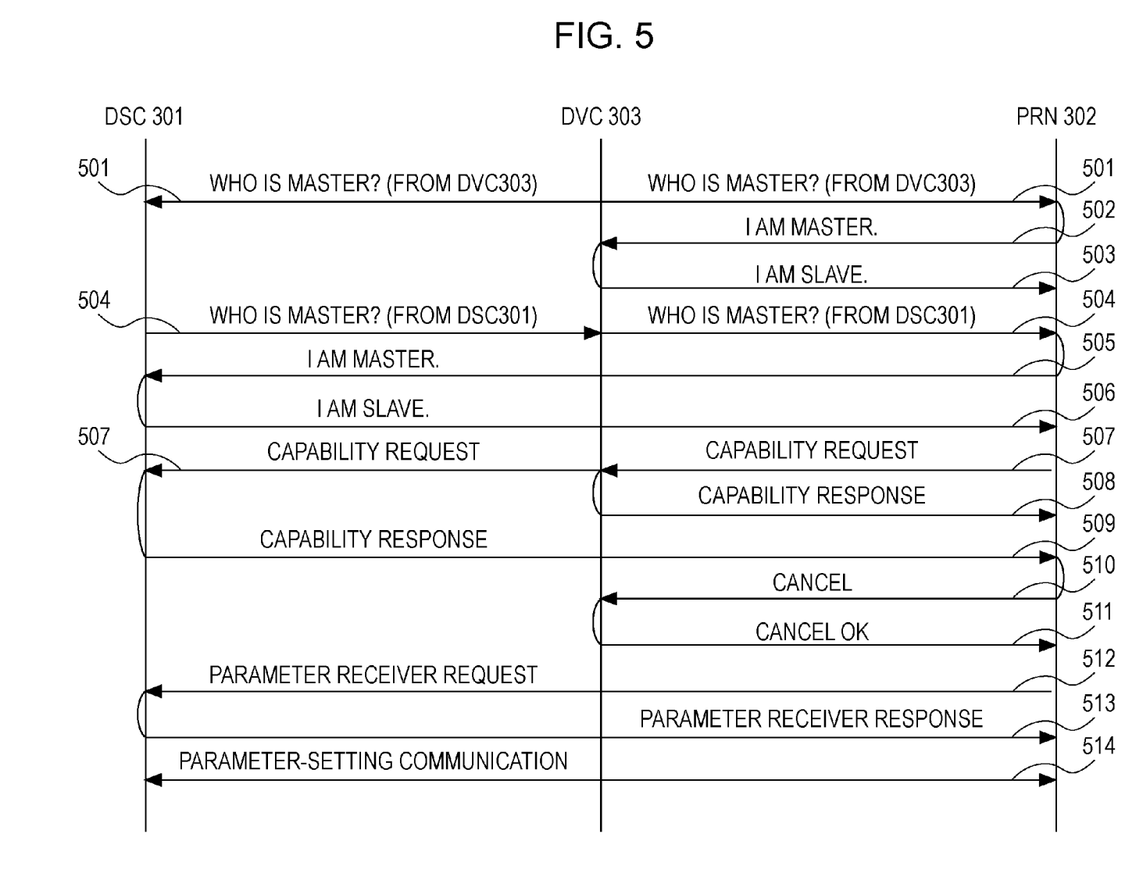
FIG. 5 is a sequence diagram of the first embodiment.

FIG. 5 is a sequence diagram of the first embodiment.

First, it is assumed that the PRN 302 exists as a master device on a network.

The master device waits for a predetermined time for other devices to participate in the network, and selects a pair of devices in which the communication parameters are to be set among the participating devices.

When the wireless communication button of the DVC 303 is pressed, the DVC 303 transmits (501) a "Who is Master?" signal via broadcast to search for the master device. The term broadcast means transmission of data to a large number of unspecified parties.

Upon receiving the "Who is Master?" signal, the PRN 302 transmits (502) an "I am Master" signal to the DVC 303 via unicast to announce that the PRN 302 is the master device. The term unicast means transmission of data to a specified party.

Upon receiving the "I am Master" signal, the DVC 303 transmits (503) an "I am slave" signal to the PRN 302, which is the master device, via unicast to announce that the DVC 303 is to become a slave device.

Then, when the wireless communication button of the DSC 301 is pressed, the DSC 301 also transmits (504) a "Who is Master?" signal via broadcast to search for the master device.

Upon receiving the "Who is Master?" signal, the PRN 302 transmits (505) an "I am Master" signal to the DSC 301 via unicast to announce that the PRN 302 is the master device.

Upon receiving the "I am Master" signal, the DSC 301 transmits (506) an "I am slave" signal to the PRN 302, which is the master device, via unicast to announce that the DSC 301 is to become a slave device.

When the waiting time for new network participating devices has expired, the PRN 302, which is the master device, selects a pair of devices in which the communication parameters are to be set.

The PRN 302 transmits (507) a "capability request" as a request for transmission of the device capabilities via broadcast to obtain the capabilities of all the devices located within the network. The "capability request" may be transmitted via unicast or via multicast that allows simultaneous transmission to a plurality of specified devices.

Upon receiving the "capability request", the slave devices, namely, the DSC 301 and the DVC 303, transmit (508 and 509) their device capabilities to the PRN 302 as "capability responses".

Upon receiving the "capability responses", the PRN 302 stores the device capabilities of those devices in the device capability table stored in the flash ROM 213. The device capability table and a method for selecting a pair of devices in which the communication parameters are to be set using the device capability table will be described with reference to FIG. 7.

The device capability table stores a Media Access Control (MAC) address, a device attribute, a device category, and a communication parameter service attribute of each device.

The device attribute indicates the type of each device (such as a printer or a still camera), and the device category indicates an input device or an output device. The communication parameter service attribute indicates whether each device has a communication-parameter-providing capability or a communication-parameter-receiving capability.

The device capabilities of the PRN 302, which is the master device, are described in Index 1. The device capabilities of the DVC 303 are described in Index 2, and the device capabilities of the DSC 301 are described in Index 3.

First, the PRN 302, which is the master device, refers to the communication parameter service attributes, and extracts a pair of devices having a "parameter provider-receiver" relationship. In this case, the pair of Index 1 and Index 2 and the pair of Index 1 and Index 3 are extracted as possible pairs. That is, the pair of the PRN 302 and the DVC 303 and the pair of the PRN 302 and the DSC 301 are extracted.

Since the above-described processing does not allow the pairs to be narrowed down until one pair is left, the PRN 302 then refers to the device categories, and extracts a pair of input and output devices, i.e., a pair of devices having an "IN-OUT" relationship. In this case, the pair of Index 1 and Index 2 and the pair of Index 1 and Index 3 are extracted.

If the above-described determination processing does not allow one pair to be determined, the PRN 302 further refers to the device attributes to determine one pair. Specifically, the PRN 302 determines the final pair based on a preferential pair pattern that is stored in advance in each device. It is assumed here that a pair of a printer and a still camera is stored as the preferential pair pattern. Accordingly, the PRN 302 selects the pair of Index 1 and Index 3 as the final pair.

The preferential pair pattern is set in advance with respect to the device attributes. Any pair of devices other than a pair of a still camera and a printer, such as a pair of a video camera and a display or a pair of a DVD player and a TV set, may be set as the preferential pair pattern.

Referring back to FIG. 5, upon determining the pair of devices in which the communication parameters are to be set, the PRN 302 transmits (510) a cancellation signal for canceling the setting of the wireless communication parameters to the DVC 303 that falls outside the selected pair. Upon receiving the cancellation signal, the DVC 303 notifies (511) the PRN 302 of the acceptance of the cancellation.

The PRN 302 transmits (512) a communication-parameter-receiver-request signal to the DSC 301 that is selected as the communication partner. The communication-parameter-receiver-request signal includes the MAC address of the PRN 302, which is the communication parameter provider. Upon receiving the communication-parameter-receiver-request signal, the DSC 301 receives the MAC address of the PRN 302, and transmits (513) a communication-parameter-receiver-response signal to the PRN 302, which is the communication parameter provider.

Then, the communication parameters are transmitted from the communication parameter provider, i.e., the PRN 302, to the communication parameter receiver, i.e., the DSC 301, and the same parameters are set (514) in the PRN 302 and the DSC 301. Therefore, wireless communication can be performed between both devices.

The operation flows of a master device and a slave device for determining a pair of devices in which the communication parameters are to be set will be described with FIGS. 9 and 10, respectively.

The master device waits for a predetermined time for devices that send a request to participate in the network. When the predetermined time has elapsed, the master device transmits a capability request to a participating slave device (step 901 shown in FIG. 9), and sets a response-waiting timer (step 902).

The slave device waits until a capability request is received from the master device (step 1001 shown in FIG. 10). Upon receiving the capability request (Yes in step 1001), the slave device transmits its device capabilities as a capability response (step 1002).

If the master device receives a capability response from the slave device before the response-waiting timer has timed out ("NO" in step 903 and "YES" in step 904), the master device stores the device capabilities included in the response in the device capability table (see FIG. 7) (step 905).

The master device repeatedly performs the processing of steps 903 through 905 until the response-waiting timer has timed out, and stores the received device capabilities of the slave devices in the device capability table.

If the response-waiting timer has timed out ("YES" in step 903), the master device refers to the communication parameter service attributes in the device capability table, and extracts a device pair having a "parameter provider-receiver" relationship (step 906).

As a result of the extraction, if no device pair is found ("NO" in step 907), the master device transmits a cancellation signal for canceling the parameter setting to the slave devices located within the network (step 914).

If only one device pair is found ("YES" in step 907 and "YES" in step 908), the process proceeds to step 912. If a plurality of device pairs are found ("NO" in step 908), the master device further refers to the device categories, and extracts a device pair having an "IN-OUT" relationship (step 909).

In this way, among the pairs of devices between which communication parameters can be exchanged, the possible device pairs are narrowed down by determining whether each of the device pairs is a pair of input and output devices. Therefore, the possibility of setting the communication parameters in an unintended pair of devices can be reduced.

If the pairs are narrowed down to select one pair ("YES" in step 910), the selected pair of devices is determined as the desired pair, and the process proceeds to step 912. As a result of the narrowing down, if a plurality of device pairs are still found ("NO" in step 910), a preferential pair pattern that is stored in advance is checked. If any pair matching the preferential pair pattern is found in the pairs, the matched pair is determined as the desired pair (step 911). Then, the process proceeds to step 912.

In step 912, the master device transmits a cancellation signal to an unselected device. The master device causes the selected pair of devices to perform communication for setting the parameters (step 913). Specifically, the master device notifies the communication parameter provider that it is to become the provider of the communication parameters, and also notifies the communication parameter provider of the MAC address of the communication parameter receiver. The master device notifies the communication parameter receiver that it is to become the receiver of the communication parameters, and also notifies the communication parameter receiver of the MAC address of the communication parameter provider. If the master device itself is the communication parameter provider or receiver, the master device may send the notifications to the other device.

The slave device transmits a capability response (step 1002), and then waits for an incoming message from the master device (step 1003). Upon receiving a message ("YES" in step 1003), the slave device performs different processing depending on the content of the received message (step 1004).

If the received message is a message for canceling the setting of the wireless communication parameters, the slave device transmits the acceptance of the cancellation to the master device (step 1005), and terminates the wireless communication (step 1006). A device that has received the cancellation signal displays on the display unit (106 or 206 shown in FIG. 1 or 2) that the setting of the wireless communication parameters has been canceled. Thus, the user can understand that the wireless communication has been canceled.

After the cancellation signal has been received, the network for setting the communication parameters may be automatically reconfigured. In this case, even if the parameters are to be set in an unintended pair of devices, the setting can be stopped, and the parameters can be set in a pair of devices that is not selected. Further, the user does not need to perform the operation again, thus increasing user convenience.

If the received message is a communication-parameter-receiver request, the slave device stores the MAC address of the communication parameter provider included in the request, and transmits a communication-parameter-receiver response to the master device (step 1007).

If the received message is a communication-parameter-provider request, the slave device stores the MAC address of the communication parameter receiver included in the request, and transmits a communication-parameter-provider response to the master device (step 1009).

Then, the communication parameters are set in the determined communication parameter provider and communication parameter receiver (step 1008), and wireless communication can therefore be performed using the set parameters.

According to the first embodiment, even if a plurality of devices exist on the same network when communication parameters are to be set, a desired pair of devices as communication partners can be selected, and the communication parameters are set in the selected pair of devices. In particular, if pairs extracted by referring to the communication parameter service attributes and the device categories are not narrowed down until one pair is left, the preferential selection processing allows one pair to be selected.

An unselected device is notified of cancellation of the parameter setting, thus preventing the communication parameters from being set in an unintended pair of devices. Further, since the master device can automatically select a pair of devices and notify cancellation, wireless communication can efficiently be established without performing a user's operation.

In the foregoing description, the preferential selection (step 911 shown in FIG. 9) is performed using the device attributes. If it is difficult to determine one device pair, a pair of devices that are stored in upper rows of the table may be selected, or a pair of devices may be randomly selected by generating random numbers.

In FIG. 9, the preferential selection processing of step 911 is performed after possible pairs are narrowed down by performing the processing of steps 907 and 909. Alternatively, before the processing of steps 907 and 909 is performed, it may be determined whether or not any pair matching the preferential pair pattern is found in the collected devices. If a pair matching the preferential pair pattern is found, the found pair may be determined as the desired pair without referring to the other information before the processing of step 912 is performed. By performing this processing, a desired pair can efficiently be determined in a case where a pair of normally used devices is known (such as a DSC and a PRN).

Second Embodiment

Figure 4:
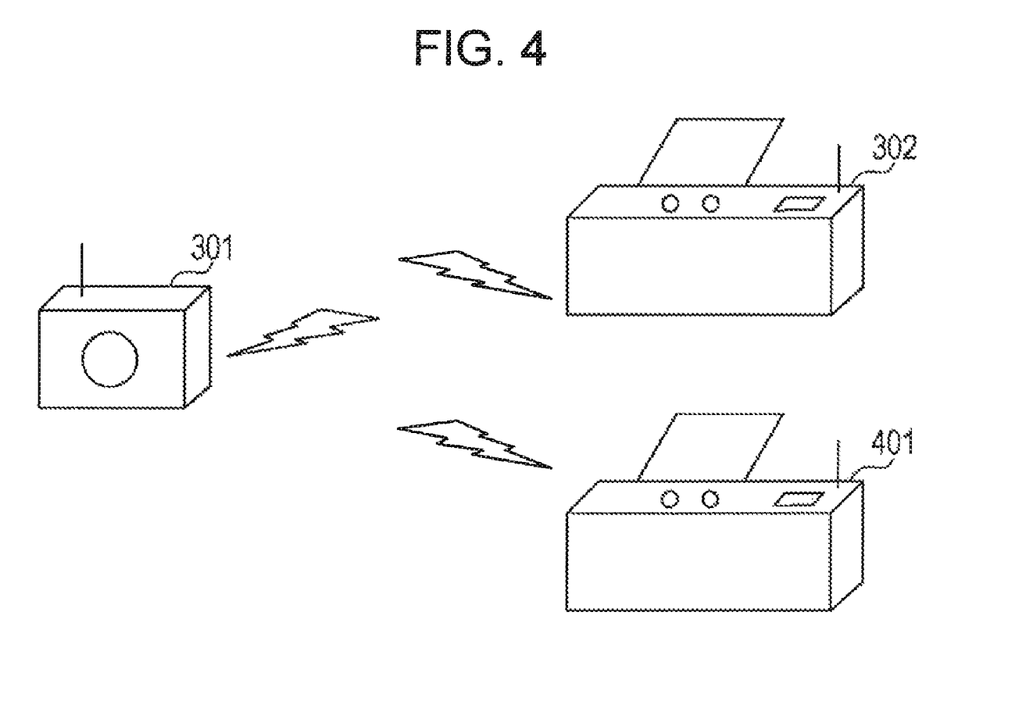
FIG. 4 is a system configuration diagram of a system according to a second embodiment of the present invention.

FIG. 4 is a system configuration diagram of a system according to a second embodiment of the present invention. In a network shown in FIG. 4, one digital camera (a DSC 301) and two printers (PRNs 302 and 401) exist. The block diagrams of those devices are similar to those of FIGS. 1 and 2, and a description thereof is thus omitted.

It is assumed here that wireless communication is performed between the DSC 301 and the PRN 302 to print image data stored in the DSC 301 using the PRN 302. The second embodiment will be described with respect to a case in which the PRN 401, which is not intended by the user, exists on the same network as the DSC 301 and the PRN 302 when the wireless communication buttons of the DSC 301 and the PRN 302 are pressed.

Figure 6:
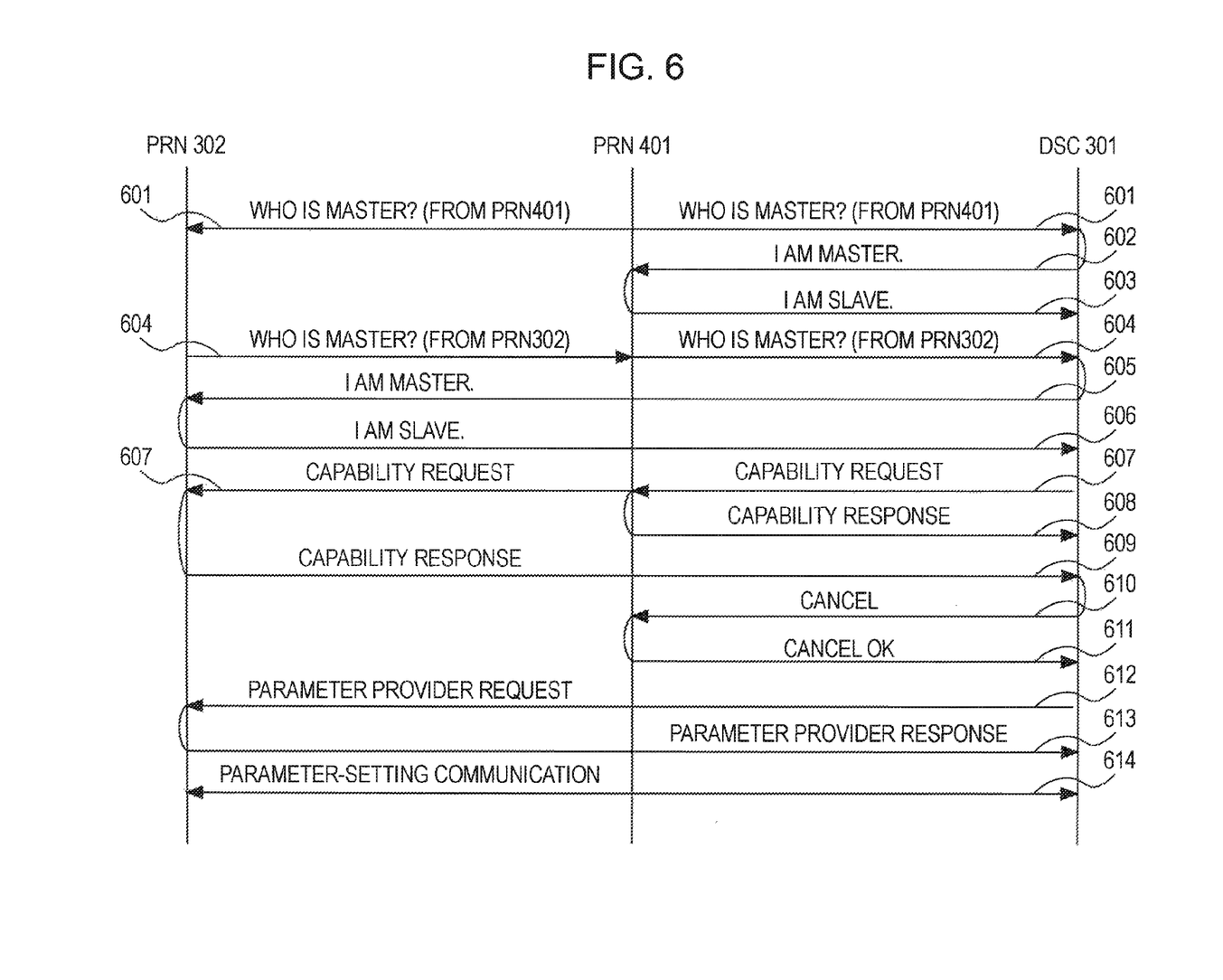
FIG. 6 is a sequence diagram of the second embodiment.

FIG. 6 is a sequence diagram of the second embodiment.

First, it is assumed that the DSC 301 exists as a master device on a network. The master device waits for a predetermined time for other devices to participate in the network, and selects a pair of devices in which the communication parameters are to be set among the participating devices.

When the wireless communication button of the PRN 401 is pressed, the PRN 401 transmits (601) a "Who is Master?" signal via broadcast to search for the master device.

Upon receiving the "Who is Master?" signal, the DSC 301 transmits (602) an "I am Master" signal to the PRN 401 via unicast to announce that the DSC 301 is the master device.

Upon receiving the "I am Master" signal, the PRN 401 transmits (603) an "I am slave" signal to the DSC 301, which is the master device, via unicast to announce that the PRN 401 is to become a slave device.

Then, when the wireless communication button of the PRN 302 is pressed, the PRN 302 also transmits (604) a "Who is Master?" signal via broadcast to search for the master device.

Upon receiving the "Who is Master?" signal, the DSC 301 transmits (605) an "I am Master" signal to the PRN 302 via unicast to announce that the DSC 301 is the master device.

Upon receiving the "I am Master" signal, the PRN 302 transmits (606) an "I am slave" signal to the DSC 301, which is the master device, via unicast to announce that the PRN 302 is to become a slave device.

When the waiting time for new network participating devices has expired, the DSC 301, which is the master device, selects a pair of devices in which the communication parameters are to be set.

The DSC 301 transmits (607) a "capability request" as a request for transmission of the device capabilities via broadcast to obtain the capabilities of all the devices located within the network. The "capability request" may be transmitted via unicast or multicast.

Upon receiving the "capability request", the slave devices, namely, the PRN 302 and the PRN 401, transmit (608 and 609) their device capabilities to the DSC 301, which is the master device, as "capability responses".

Upon receiving the "capability responses", the DSC 301 stores the device capabilities of those devices, such as the device attributes, in the device capability table stored in the flash ROM 113. The device capability table and a method for selecting a pair of devices in which the communication parameters are to be set using the device capability table will be described with reference to FIG. 8.

The device capabilities of the DSC 301, which is the master device, are described in Index 1. The device capabilities of the PRN 401 are described in Index 2. The device capabilities of the PRN 302 are described in Index 3. The PRN 302 has both communication-parameter-providing and receiving capacities.

First, the DSC 301, which is the master device, refers to the communication parameter service attributes, and extracts a pair of devices having a "parameter provider-receiver" relationship. In this case, the pair of Index 1 and Index 3 and the pair of Index 2 and Index 3 are extracted as possible communication pairs. That is, the pair of the DSC 301 and the PRN 302, and the pair of the PRN 401 and the PRN 302 are extracted.

Then, the DSC 301 refers to the device categories, and extracts a pair of input and output devices, i.e., a pair of devices having an "IN-OUT" relationship, from the extracted pairs. In this case, the pair of Index 1 and Index 3 is extracted. That is, only one pair of devices, i.e., the pair of the DSC 301 and the PRN 302, is found. Thus, the DSC 301 determines the pair of the DSC 301 and the PRN 302 as the pair of devices in which the communication parameters are to be set.

Referring back to FIG. 6, upon determining the pair of devices in which the communication parameters are to be set, the DSC 301 transmits (610) a cancellation signal for canceling the setting of the wireless communication parameters to the PRN 401 that falls outside the selected pair. Upon receiving the cancellation signal, the PRN 401 notifies (611) the DSC 301 of the acceptance of the cancellation.

The DSC 301 transmits (612) a communication-parameter-provider-request signal to the PRN 302 that is selected as the communication partner. The communication-parameter-provider-request signal includes the MAC address of the DSC 301, which is the communication parameter receiver. Upon receiving the communication-parameter-provider-request signal, the PRN 302 receives the MAC address of the DSC 301, and transmits (613) a communication-parameter-provider-response signal to the DSC 301, which is the communication parameter receiver.

Then, the communication parameters are transmitted from the communication parameter provider, i.e., the PRN 302, to the communication parameter receiver, i.e., the DSC 301, and the same parameters are set (614) in the PRN 302 and the DSC 301. Therefore, wireless communication can be performed between both devices.

The operation flows of a master device and a slave device are similar to those of the first embodiment, and a description thereof is thus omitted.

According to the second embodiment, even if a plurality of devices exist on the same network when communication parameters are to be set, a desired pair of devices as communication partners can be selected, and the communication parameters are set in the selected pair of devices. An unselected device is notified of cancellation of the parameter setting, thus preventing the communication parameters from being set in an unintended pair of devices. Further, the master device can automatically select a pair of devices, thus increasing user convenience. Therefore, wireless communication can efficiently be established.

In the first and second embodiments, the communication-parameter-provider-request signal includes the MAC address of the parameter receiver. The MAC address may be separately transmitted. Further, the MAC address of the parameter receiver may be transmitted after the communication-parameter-provider-response signal is received. The same applies to the MAC address of the parameter provider included in the communication-parameter-receiver-request signal.

In the first and second embodiments, the master device itself is a parameter provider or receiver. A pair of slave devices may be selected as the desired pair, and the communication parameters may be set in the pair of slave devices.

In the first and second embodiments, the communication parameters are set in two devices. The present invention can also be applied to a case in which the communication parameters are set in three or more devices. For example, it is assumed that a user performs setting in advance so that wireless communication is to be performed between three devices, wherein five devices constitute a communication parameter setting network. In this case, the master device determines a combination of three devices (the processing of steps 906 through 911 shown in FIG. 9), and notifies the unselected two devices of cancellation of the communication parameter setting (step 912) so that the communication parameters can be set in the selected devices (step 913).

The present invention may employ wireless communication using any wireless communication technique such as 802.11 wireless LAN, Bluetooth, UWB (Ultra Wide Band), Wireless USB, Wireless 1394, or WIMAX (Worldwide Interoperability for Microwave Access). The present invention can provide not only the setting of wireless communication parameters but also wired communication parameters.

In the above-described embodiments, communication devices have been discussed in the context of a digital still camera, a printer, and a digital video camera. The communication devices may also include devices such as PCs, copying machines, and mobile phones.

According to the above-described embodiments, therefore, when communication parameters are to be set in devices, a problem experienced when devices other than the devices in which the communication parameters are to be set exist on a network can be addressed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-034033 filed Feb. 10, 2006, which is hereby incorporated by reference herein in its entirety.

What is claimed is:

1. A communication device comprising:
a processor that controls the following:
a configuration unit that configures a first network for sharing communication parameters to configure a second network, the communication parameters including at least one of an encryption method, and encryption key, and authentication method, and an authentication key;

a storing unit configured to store one or more predetermined device combinations in a predetermined combination selection order;
a collecting unit that collects capability information and category information of one or more other communication devices located on the first network, the capability information including a communication parameter service attribute that indicates whether the device has one or more of a communication-parameter-providing capability and a communication-parameter-receiving capability, and the category information indicating whether the device is one or more of an input device and an output device;
an extracting unit that performs first extraction that extracts, on the basis of capability information including the communication parameter service attribute of the other communication devices collected by the collecting unit, at least one combination of devices, wherein each of the combination of devices comprises a provider device having the communication-parameter-providing capability that provides the communication parameters to configure the second network, and one or more receiver devices having the communication-parameter-receiving capability that receives the communication parameters from the provider device;
performs second extraction that extracts, in a case where the first extraction extracts a plurality of combinations of devices, on the basis of the category information of the other communication devices collected by the collecting unit, at least one combination of devices including an input device and an output device, from among the plurality of the combination of devices extracted by the first extraction;
performs third extraction that extracts, in case where the second extraction unit extracts a plurality of combinations of devices, on the basis of the predetermined device combinations stored in the storing unit, a combination of devices corresponding to a predetermined device combination according to the predetermined combination selection order, from among the plurality of the combination of devices extracted by the second extraction;
a communication parameter setting unit configured, in a case where at least one of the first, second and third extractions extracts one combination of devices including a provider device and one or more receiver devices, to set communication parameters in the devices included in the extracted one combination of devices; and
a notifying unit that notifies, a device that is not included in the extracted combination of devices, of cancellation of a communication parameter setting process for sharing the communication parameters between the provider device and the one or more receiver devices, that notifies the extracted provider device that it is to become the provider device and of an address of the one or more receiver devices, and that notifies the extracted one or more receiver devices that it is to become the receiver device and of an address of the provider device.

2. A communication device comprising:
a processor that controls the following:
a configuration unit that configures a first network for sharing communication parameters to configure a second network, the communication parameters including at least one of an encryption method, an encryption key, and authentication method, and an authentication key;
a storing unit configured to store one or more predetermined device combinations in a predetermined combination selection order;
a collecting unit that collects capability information and category information of one or more other communication devices located on the first network;
a determining unit that determines first information and second information as capability information of other communication devices collected by the collecting unit, wherein the first information is a communication parameter service attribute that indicates whether each of the other devices has one or more of a communication-parameter-providing capability and a communication-parameter-receiving capability and the second information is category information that indicates whether each of the other devices is one or more of an input device and an output device;
an extracting unit that performs first extraction that extracts at least one combination of devices including a device having the communication-parameter-providing capability and one or more devices having the communication-parameter-receiving capability, based on the first information collected by the collecting unit;
performs second extraction that extracts, in a case where the first extraction extracts a plurality of combinations of devices, at least one combination of devices including an input device and an output device, from among the plurality of the combination of devices extracted by the first extraction on the basis of the second information;
performs third extraction that extracts, in a case where the second extraction extracts a plurality of devices, a combination of devices corresponding to the predetermined device combination according to the predetermined combination selection order, from among the plurality of the combination of devices extracted by the second extraction on the basis of the predetermined device combinations stored in the storing unit;
a communication parameter setting unit configured, in a case where at least one of the first, second and third extractions extracts one combination of devices including a provider device and one or more receiver devices, to set communication parameters in the devices; and
a notifying unit that notifies, if at least one of the first, second and third extractions extracts one combination of devices, a device, that is not the device in the one combination of devices extracted by at least one of the first, second and third extractions, of cancellation of a communication parameter setting process for sharing the communication parameters between the devices in the combination of devices extracted by at least one of the first, second and third extractions, that notifies a provider device, which is in the combination of devices extracted by at least one of the first, second and third extractions, that it is to become the provider device and of an address of one or more receiver devices, and that notifies the one or more receiver devices, which is in the combination of devices extracted by at least one of the first, second and third extractions, that it is to become the receiver device and of an address of the provider device.

3. A method for controlling a communication device for setting a communication parameter, the method comprising:
a configuration step of configuring a first network for sharing communication parameters to configure a second network, the communication parameters including at least one of an encryption method, an encryption key, an authentication method, and an authentication key;
a storing step of storing one or more predetermined device combinations in a predetermined combination selection order a collecting step of collecting capability information and category information of one or more other communication devices located on the first network, the capability information including a communication parameter service attribute that indicates whether the device has one or more of a communication-parameter-providing capability and a communication-parameter receiving capability, and the category information indicating whether the device is one or more of an input device and an output device;

a first extracting step of extracting, on the basis of capability information including the communication parameter service attribute of the communication devices collected in the collecting step, at least one combination of devices, wherein each combination of devices comprises a provider device having the communication-parameter-providing capability that provides the communication parameters to configure the second network, and one or more receiver devices having the communication-parameter-receiving capability that receives the communication parameters from the provider device;

a second extracting step of extracting, in a case where the first extracting step extracts a plurality of combinations of devices, on the basis of the category information of the other communication devices collected by the collecting unit, at least one combination of devices including an input device and an output device, from among the plurality of the combination of devices extracted by the first extracting step;

a third extracting step that extracts, in case where the second extracting step extracts a plurality of combinations of devices, on the basis of the predetermined device combinations stored in the storing step, a combination of devices corresponding to a predetermined device combination according to the predetermined combination selection order, from among the plurality of the combination of devices extracted by the second extracting step;

a communication parameter setting step of, in a case where at least one of the first, second and third extracting steps extracts one combination of devices including a provider device and one or more receiver devices, setting communication parameters in the devices included in the extracted one combination of devices; and a notifying step of notifying, a device that is not included in the extracted combination of devices, of cancellation of a communication parameter setting process for sharing the communication parameters between the provider device and the one or more receiver devices, notifying the provider device included in the extracted combination of devices that it is to become the provider device and of an address of the one or more receiver devices, and notifying the one or more receiver devices included in the extracted combination of devices that it is to become the receiver device and of an address of the provider device.

4. A communication method for setting a communication parameter, the communication method comprising:

a step of, by communication devices, configuring a first network for sharing communication parameters to configure a second network, the communication parameters including at least one of an encryption method, an encryption key, an authentication method, and an authentication key;

a storing step of storing one or more predetermined device combinations in a predetermined combination selection order;

a collecting step of collecting capability information and category information of one or more other communication devices located on the first network;

a step of determining first information and second information as capability information of other communication devices collected in the collecting step, wherein the first information is a communication parameter service attribute that indicates whether each of the other devices has one or more of a communication-parameter-providing capability and a communication-parameter-receiving capability and the second information is category information indicates whether each of the other devices is one or more of an input device and an output device;

a first extracting step of extracting at least one combination of devices including a device having the communication-parameter-providing capability and one or more devices having the communication-parameter-receiving capability, based on the first information collected by the collecting unit;

a second extracting step of extracting, in a case where the first extracting step extracts a plurality of combinations of devices, at least one combination of devices including an input device and an output device, from among the plurality of the combination of devices extracted in the first extracting step on the basis of the second information;

a third extracting step of extracting, in a case where the second extracting step extracts a plurality of devices, a combination of devices corresponding to the predetermined device combination according to the predetermined combination selection order, from among the plurality of the combination of devices extracted by the second extracting step on the basis of the predetermined device combinations stored in the storing step;

a communication parameter setting step of, in a case where at least one of the first, second and third extracting steps extracts one combination of devices including a provider device and one or more receiver devices, setting communication parameters in the devices; and a notifying step of notifying, if at least one of the first, second and third extracting steps extracts one combination of devices, a device, that is not the device in the one combination of devices extracted by at least one of the first, second and third extracting steps, of cancellation of a communication parameter setting process for sharing the communication parameters between the devices in the combination of devices extracted by at least one of the first, second and third extracting steps, that notifies a provider device, which is in the combination of devices extracted by at least one of the first, second and third extracting steps, that it is to become the provider device and of an address of one or more receiver devices, and that notifies the one or more receiver devices, which is in the combination of devices extracted by at least one of the first, second and third extracting steps, that it is to become the receiver device and of an address of the provider device.

5. A non-transitory computer readable medium storing a program for use in performing a method for controlling a communication device, the method comprising:

a configuration step of configuring a first network for sharing communication parameters to configure a second network, the communication parameters including at least one of an encryption method, and encryption key, an authentication method, and an authentication key;

a storing step of storing one or more predetermined device combinations in a predetermined combination selection order;

a collecting step of collecting capability information and category information of one or more other communication devices located on the first network, the capability information including a communication parameter service attribute that indicates whether the device has one or more of a communication-parameter-providing capability and a communication-parameter-receiving capability, and the category information indicating whether the device is one or more of an input device and an output device;

a first extracting step of extracting, on the basis of capability information including the communication parameter service attribute of the other communication devices collecting in the collecting step, at least one combination of devices, wherein each combination of devices comprises a provider device having the communication-parameter-providing capability that provides a communication parameters to configure the second network, and one or more receiver devices having the communication-parameter-receiving capability that receives the communication parameters from the provider device;

a second extracting step of extracting, in a case where the first extracting step extracts a plurality of combinations of devices, on the basis of the category information of the other communication devices collected by the collecting unit, at least one combination of devices including an input device and an output device, from among the plurality of the combination of devices extracted by the first extracting step;

a third extracting step that extracts, in case where the second extracting step extracts a plurality of combinations of devices, on the basis of the predetermined device combinations stored in the storing step, a combination of devices corresponding to a predetermined device combination according to the predetermined combination selection order, from among the plurality of the combination of devices extracted by the second extracting step;

a communication parameter setting step of, in a case where at least one of the first, second and third extracting steps extracts one combination of devices including a provider device and one or more receiver devices, setting communication parameters in the devices included in the extracted one combination of devices; and a notifying step of notifying, a device that is not included in the extracted combination of devices, of cancellation of a communication parameter setting process for sharing the communication parameters between the provider device and the one or more receiver devices, notifying the provider device included in the extracted combination of devices that it is to become the provider device and of an address of the one or more receiver devices, and notifying the one or more receiver devices included in the extracted combination of devices that it is to become the receiver device and of an address of the provider device.

6. A non-transitory computer readable medium storing a program for use in performing a communication method for setting a communication parameter, the method comprising:

a step of, by communication devices, configuring a first network for sharing communication parameters to configure a second network, the communication parameters including at least one of an encryption method, an encryption key, an authentication method, and an authentication key;

a storing step of storing one or more predetermined device combinations in a predetermined combination selection order a collecting step of collecting capability information and category information of one or more other communication devices located on the first network;

a step of determining first information and second information as capability information of other communication devices collected in the collecting step, wherein the first information is a communication parameter service attribute that indicates whether each of the other devices has one or more of a communication-parameter-providing capability and a communication-parameter-receiving capability and the second information is category information indicates whether each of the other devices is one or more of an input device and an output device;

a first extracting step of extracting at least one combination of devices including a device having the communication-parameter providing capability and one or more devices having the communication-parameter receiving capability, based on the first information collected by the collecting step;

a second extracting step of extracting, in a case where the first extracting unit extracts a plurality of combinations of devices, at least one combination of devices including an input device and an output device, from among the plurality of the combination of devices extracted in the first extracting step on the basis of the second information;

a third extracting step of extracting, in a case where the second extracting step extracts a plurality of devices, a combination of devices corresponding to the predetermined device combination according to the predetermined combination selection order, from among the plurality of the combination of devices extracted by the second extracting step on the basis of the predetermined device combinations stored in the storing step;

a communication parameter setting step of, in a case where at least one of the first, second and third extracting steps extracts one combination of devices including a provider device and one or more receiver devices, setting communication parameters in the devices; and a notifying step of notifying, if at least one of the first, second and third extracting steps extracts one combination of devices, a device, that is not the device in the one combination of devices extracted by at least one of the first, second and third extracting steps, of cancellation of a communication parameter setting process for sharing the communication parameters between the devices in the combination of devices extracted by at least one of the first, second and third extracting steps, that notifies a provider device, which is in the combination of devices extracted by at least one of the first, second and third extracting steps, that it is to become the provider device and of an address of one or more receiver devices, and that notifies the one or more receiver devices, which is in the combination of devices extracted by at least one of the first, second and third extracting steps, that it is to become the receiver device and of an address of the provider device.

* * * * *